(12) United States Patent
Bolton

(10) Patent No.: US 9,227,678 B2
(45) Date of Patent: Jan. 5, 2016

(54) LOCKING WHEEL RIM COVER

(71) Applicant: Gary Bolton, Wilmington, NC (US)

(72) Inventor: Gary Bolton, Wilmington, NC (US)

( * ) Notice: Subject to any disclaimer, the term of this patent is extended or adjusted under 35 U.S.C. 154(b) by 387 days.

(21) Appl. No.: 13/851,263

(22) Filed: Mar. 27, 2013

(65) Prior Publication Data

US 2014/0077583 A1 Mar. 20, 2014

Related U.S. Application Data

(60) Provisional application No. 61/618,916, filed on Apr. 2, 2012.

(51) Int. Cl.
*B62D 43/00* (2006.01)

(52) U.S. Cl.
CPC .................................. *B62D 43/007* (2013.01)

(58) Field of Classification Search
CPC ....... B62D 43/00; B62D 43/02; B62D 43/007
USPC ............ 301/37.21, 37.23, 37.35, 37.1, 37.32, 301/37.37; 224/42.12, 42.13, 42.21, 42.25
See application file for complete search history.

(56) References Cited

U.S. PATENT DOCUMENTS

| | | | | |
|---|---|---|---|---|
| 19,993 A * | 4/1858 | Jandus et al. | ........... | A01L 11/00 168/44 |
| 1,881,567 A * | 10/1932 | Henke, Jr. | ............ | B62D 43/007 70/18 |
| 4,284,218 A | 8/1981 | Gillis et al. | | |
| 4,498,614 A | 2/1985 | Guarr | | |
| 4,516,706 A | 5/1985 | Niehaus | | |
| 4,751,833 A | 6/1988 | Stumpf, Jr. | | |
| 4,993,609 A | 2/1991 | Flint | | |
| 5,076,477 A | 12/1991 | Colgan | | |
| 5,426,963 A | 6/1995 | Tafoya et al. | | |
| 5,487,288 A * | 1/1996 | Frantz | ................. | B62D 43/007 224/42.12 |
| 5,513,788 A * | 5/1996 | Cochrane | ............. | B62D 43/045 224/42.12 |
| 5,531,508 A * | 7/1996 | Bell, III | .................. | B60C 27/04 301/37.109 |
| 5,823,413 A * | 10/1998 | Seltz | ...................... | B62D 43/04 224/402 |
| 5,996,863 A | 12/1999 | Burke | | |
| 6,427,885 B1 | 8/2002 | Dexel | | |
| 6,632,074 B2 * | 10/2003 | Murakami | ............ | F04B 25/005 417/222.1 |
| 7,195,231 B2 * | 3/2007 | Murphy | ............... | B62D 43/045 224/42.21 |
| 8,002,930 B2 | 8/2011 | Fischer et al. | | |
| 8,777,327 B1 * | 7/2014 | Faux | ........................ | B60B 7/16 301/37.21 |
| 2005/0077327 A1 | 4/2005 | Kenney | | |
| 2008/0023507 A1 | 1/2008 | Uebler | | |
| 2008/0047985 A1 | 2/2008 | Newbill | | |
| 2008/0230576 A1 | 9/2008 | Arabadjis | | |

* cited by examiner

*Primary Examiner* — S. Joseph Morano
*Assistant Examiner* — Jean Charleston
(74) *Attorney, Agent, or Firm* — MacCord Mason PLLC

(57) ABSTRACT

A locking wheel rim cover is described for attachment to the outer face of a spare wheel rim having a given diameter, an outer face and log openings. The cover includes a circular rim plate having a diameter substantial the same as the diameter of the wheel rim, an inner face and an outer face; a locking member extending inwardly from the inner face of the rim plate; a first attachment member extending inwardly from the inner face of the rim plate; and an attachment bracket mountable on the outer face of the wheel rim, the bracket including a locking member opening to receive the locking member, a second attachment member connectable with the first attachment member and inwardly extending adapters sized for insertion into the wheel lug openings.

20 Claims, 7 Drawing Sheets

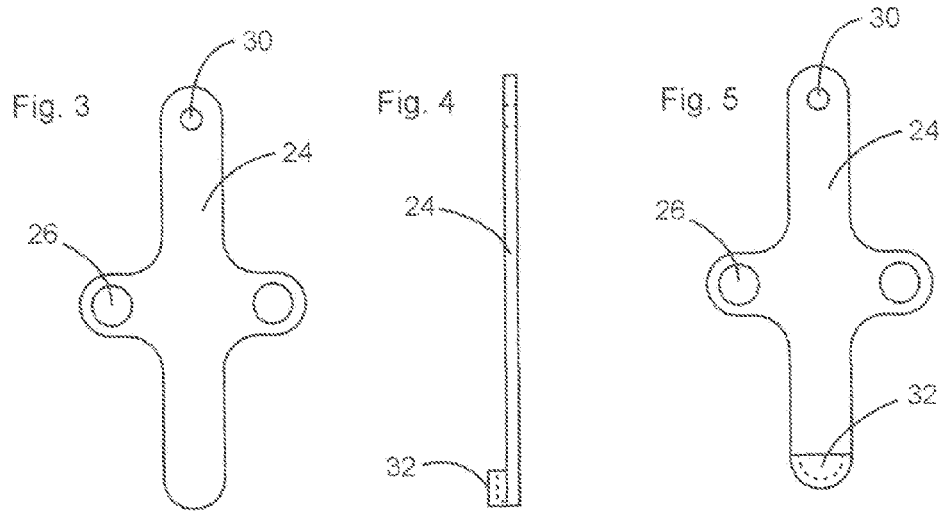
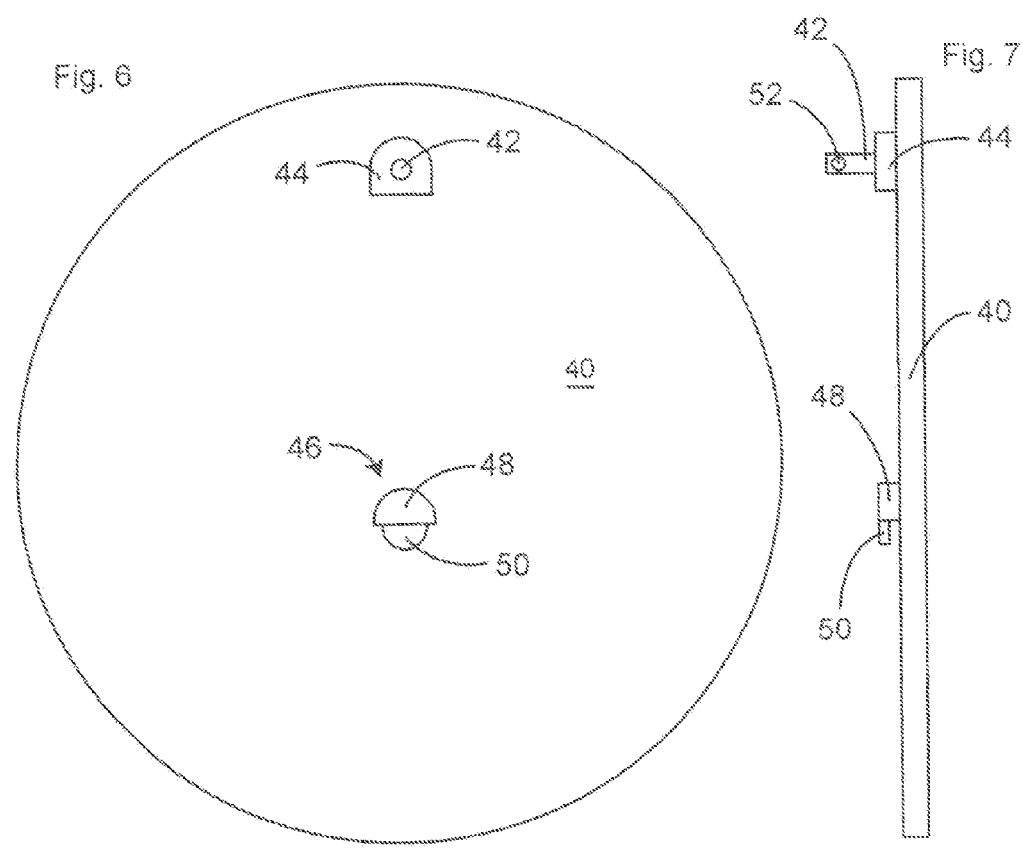

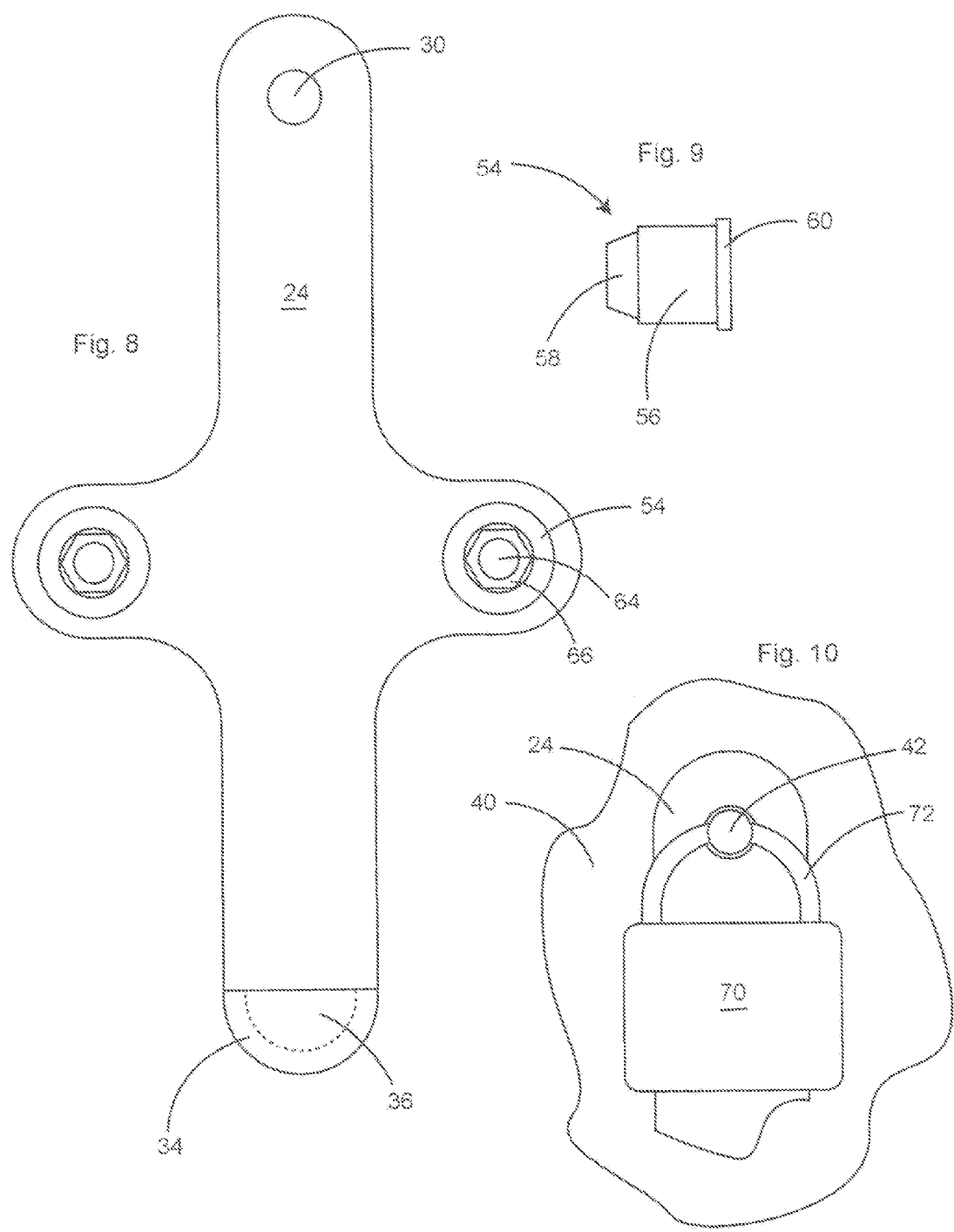

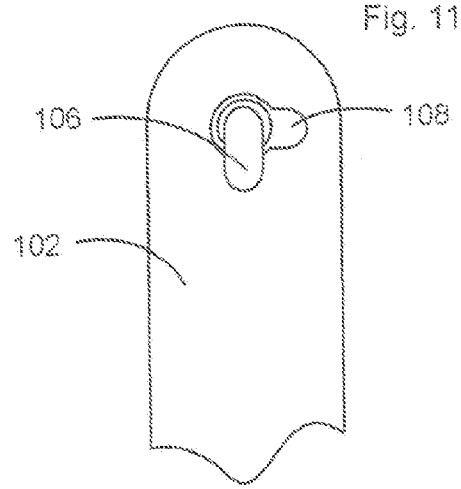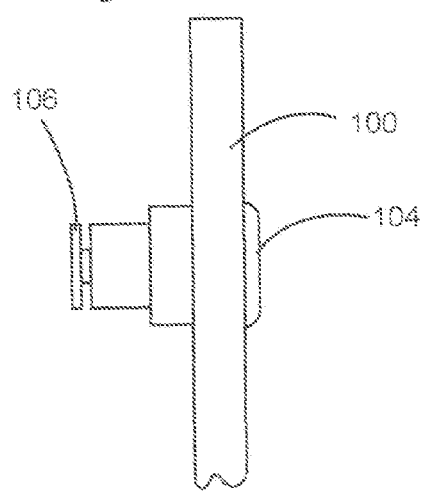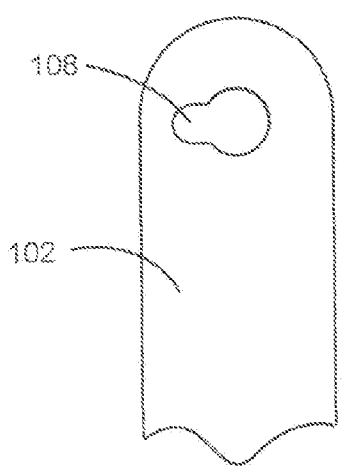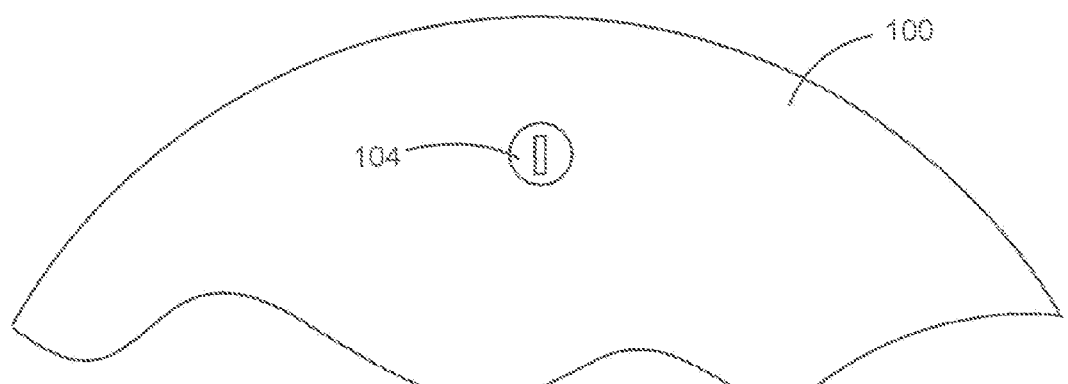

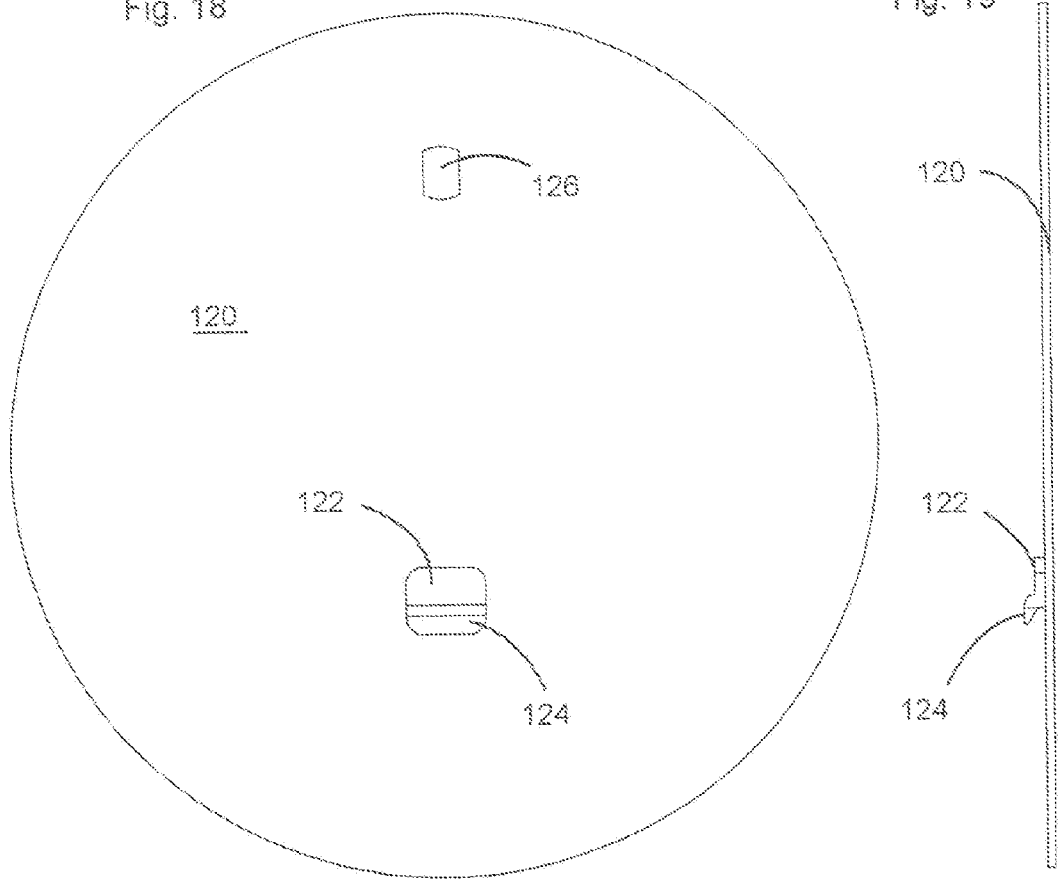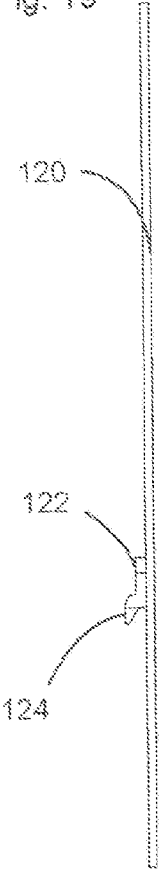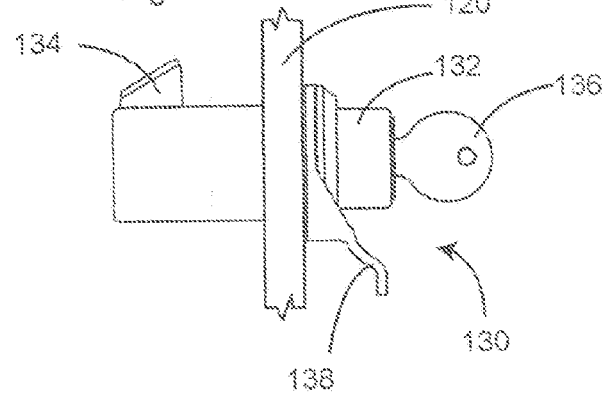

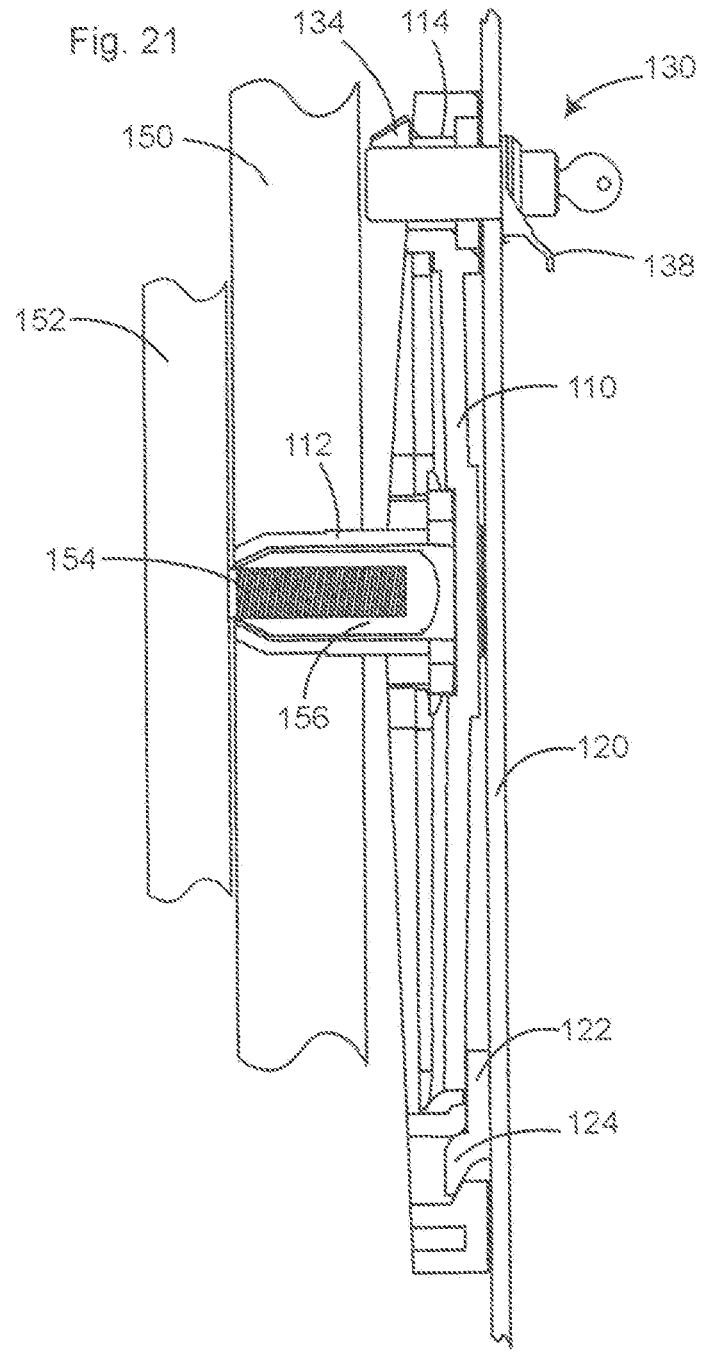

LOCKING WHEEL RIM COVER

This application claims the benefit of and priority to the filing date of U.S. Provisional Application Ser. No. 61/618,916, filed Apr. 2, 2012, the entire content of which is incorporated herein.

BACKGROUND OF THE INVENTION (1) Field of the Invention

The present invention relates to a decorative cover adapted to fit onto the enter surface of the rim of a spare wheel attached to the rear of a motor vehicle, and in particular to a rim cover that can be locked to prevent theft of the spare wheel.

(2) Description of the Prior Art

Many vehicles, especially off-road type vehicles such as Jeeps and the like, have a spare wheel often called a spare tire, mounted with a support bracket onto the rear of the vehicle. As used herein, the term "spare wheel" means the combination of the metal wheel rim and the tire that is mounted on the rim.

Spare wheels are often covered with a cover that extends over the wheel rim and tire for decorative purposes and also to protect the wheel from accumulation of dirt and debris. These wheel covers are commonly made of fabric, although some covers are constructed of metal. In addition, some vehicles include rim covers that are attached only over the outer surface of the wheel rim. Generally, these covers do not deter theft of the spare wheel.

As used in the following description, the term "outer" refers to the side away from the vehicle when the spare wheel is mounted on the vehicle, while "inner" refers to the side towards the vehicle.

SUMMARY OF THE INVENTION

The present invention relates to a rim cover that can be locked to prevent removal of the spare wheel. Generally, the rim cover of the present invention is comprised of a circular rim plate having a diameter substantially corresponding to the diameter of the wheel rim, and an attachment bracket that is attachable via lug nuts to the wheel rim and to the rim plate.

More specifically, the rim plate has a circular cross-section. The size of the rim is equal to or slightly greater than the diameter of the rim, so that the rim is covered, but the tire is substantially uncovered. The rim plate is preferably planar with inner and outer parallel faces. The plate may be constructed of aluminum, steel or other metal, or of a scratch resistant plastic. The outer face of the plate may be decorated with indicia such as a name, picture, etc. The indicia can be painted, applied as a decal, or by other known means.

The inner face of the rim plate includes a plate attachment member and a plate locking member. Preferably, the locking member is near the edge of the rim plate inner face, with the attachment member being radially aligned with the locking member. Preferably, the locking member is adjacent the top of the plate, while the attachment member is spaced beneath the locking member. In one embodiment of the invention, the attachment member includes a projection or tongue, while the locking member is in the form of a peg that extends perpendicularly inward from the plate inner face, with the peg including a transverse lock receiving bore adjacent its distal end to receive the shackle of a padlock. In another embodiment the locking member is a cam lock mounted on the wheel rim and extending through the attachment member when the wheel rim is mounted. Depending on the design, the cam lock is locked by rotating the cam lock cam with an insertable key, or by pressing a button to retract the spring loaded cam.

The attachment bracket is generally planar with inner and outer faces. The outer face of the bracket includes a bracket locking member and a bracket attachment member. The bracket attachment member is adapted to releasably join with the plate attachment member, while the bracket locking member, e.g., an insertion hole, cooperates with plate locking member. The bracket members are spaced so that the locking members come together when the attachment members are connected and the rim plate is positioned against the attachment bracket.

The attachment bracket also includes two openings spaced to align with two of the lug openings in the wheel rim. Preferably, the openings align with adjacent, horizontal lug openings. In a preferred embodiment, the present invention also includes a pair of adapters that are sized for insertion into the openings. The adapters may be separate horn the bracket or integrally formed with the bracket. Each adapter has a central cylindrical section with an outer circumference sized to correspond to the opening into winch it is inserted, and an inner bore sized to receive a lug nut. The outer edge of the cylinder of the adapter, if separately formed, includes a flange to fit against the outer face of the attachment bracket and prevent the adapter from sliding completely through the hole. The inner race of the adapter tapers inwardly to fit the lag.

In one embodiment of the invention, the bracket attachment member is located at the bottom of the outer face of the bracket and includes a recess for insertion of a downwardly projecting attachment member on the inner race of the rim plate. A hole is positioned near the upper edge of the bracket to receive a pin projecting inwardly from the inner face of the rim plate. The pin is of a sufficient length to expose a transverse bore adjacent the distal end of the pin when the pin is fully inserted.

To mount the rim cover onto the rim of a spare wheel, the bracket is attached to the outer surface of the wheel rim by inserting the adapters into the openings In the bracket and over the lugs extending from the mounting frame. Lug nuts are then tightened onto the lugs to secure the bracket. The rim plate is then attached to the bracket by attaching the bracket arid plate attachment members together and inserting the locking pin through the locking bole in the bracket. When mounted, the rim plate fits against the outer face of the wheel rim with the edge of the plate extending slightly beyond the rim.

After the pin is inserted, the user can swing the spare wheel mounting arm away from the vehicle and reach through the wheel rim to insert the shackle of a padlock through the pin bore and close the padlock to prevent removal of the pin from the attachment bracket, thereby preventing removal of the rim plate. As a result, access to the lug nuts holding the wheel to the mounting arm cannot be removed, thereby preventing theft of the wheel.

When the locking member is a cam lock mounted on the wheel rim, the wheel rim is simply positioned on the rim with the latching members joined as described above. The cam end of the cam lock is extended through the attachment member opening, and the cam lock is either rotated with a key to lock the wheel rim to the wheel or the spring loaded cam protects against the inner face of the attachment bracket and can be retracted with a pushbutton.

BRIEF DESCRIPTION OF THE DRAWINGS

FIG. 3 is a view of the inner face of the attachment bracket.

FIG. 4 is a side view of the attachment bracket.

FIG. 5 is a view of the outer face of the attachment bracket.

FIG. 6 is a view of the inner face of the rim plate.

FIG. 7 is a side view of the rim plate.

FIG. 8 is a view of the enter face of the attachment bracket showing adapters used in attaching the bracket to lugs.

FIG. 9 is a side view of an adapter.

FIG. 10 is a detailed inner view of a padlock locking the rim plate to the attachment bracket.

FIG. 11 is a detailed view of the inner face of the upper end of the attachment bracket with a cam lock having a rotatable cam.

FIG. 12 is a detailed view of the enter face of the upper end of the attachment bracket with an opening for insertion of a cam lock.

FIG. 13 is a detailed side view of the cam lock mounted on the wheel rim.

FIG. 14 is a partial view of the outer face of the wheel rim with mounted cam lock.

FIG. 18 is a view of the inner face of an alternative rim plate.

FIG. 19 is a side view of an alternative rim plate.

FIG. 20 is a detailed side view of a keylocking/flush knob latch mounted on a wheel rim.

FIG. 21 is a sectional side view showing the assembled wheel rim cover attached to a wheel rim that is attached to a spare wheel mounting arm.

DETAILED DESCRIPTION OF THE INVENTION

In the following description, terms such as horizontal upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
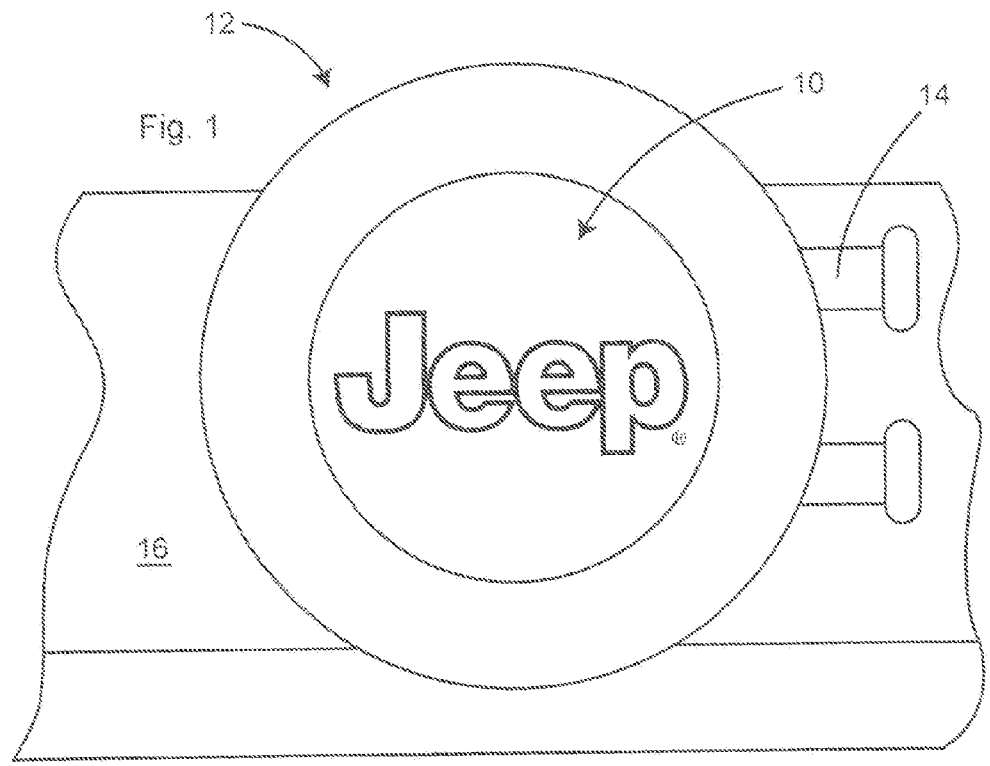
FIG. 1 is an outer view of the rim cover mounted on a spare wheel, which in turn is mounted on the spare wheel mounting bracket on the back of a vehicle.

FIG. 1 illustrates a preferred embodiment of the rim cover, generally 10, mounted on a spare wheel, generally 12, which is mounted on the spare wheel mounting arm 14 on the rear of a vehicle 16.

Figure 2:
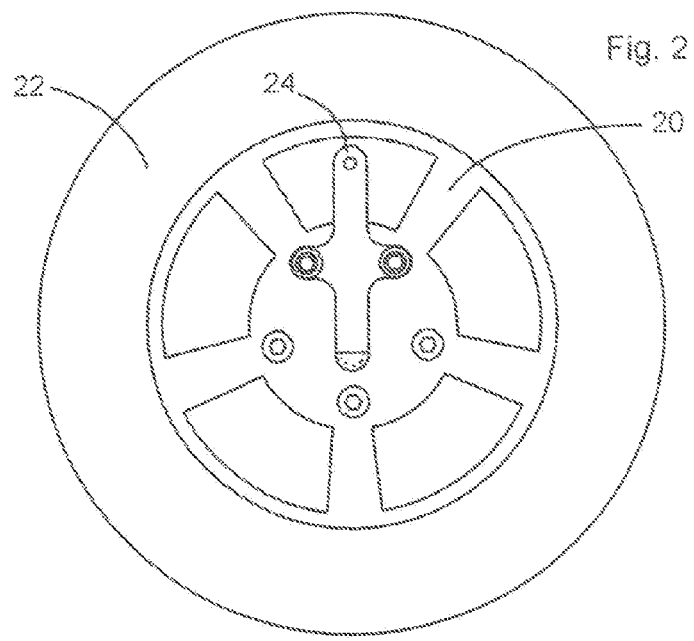
FIG. 2 is an enter view of a spare wheel with the attachment bracket secured to adjacent lugs.

FIG. 2 illustrates spare wheel 12 comprised of a wheel rim 20 and spare tire 22, with attachment bracket 24 secured to the outer face of rim 20. As illustrated in FIGS. 3-5, attachment bracket 24 includes horizontal spaced lop mounting holes 26, and a peg insertion hole 30 adjacent the top of the bracket 24. A first latch member 32 is positioned adjacent the bottom on the outer face of bracket 24. Latch member 32 includes a spacer 34 with an upwardly extending recess 36.

As illustrated in FIGS. 6 and 7, rim plate 40 includes locking peg 42 and spacer 44 adjacent the upper edge of plate 40 and a second latch member 46 spaced beneath peg 42. Latch member 46 is spaced at a distance such that peg 42 is insertable into hole 30 when latch member 46 is joined with latch member 32. Latch member 46 includes spacer 48 and downwardly extending tongue 50, which is sized for insertion into recess 36 of latch member 32. Peg 42 includes a transverse locking bore 52 adjacent its distal end.

FIG. 8 is a detailed view of the outer face of attachment bracket 24 showing adapters 54 inserted into mounting holes 26. Each adapter 54, illustrated in FIG. 9, is comprised of a cylinder 56 having a tapered inner end 58 and a flange 60 around its outer end. The inner bore 62 of adapter 54 is sized to receive lug 64 and nut 66.

FIG. 10 illustrates a padlock 70 having a shackle 72 inserted into bore 52 of peg 42 to secure plate 40 to bracket 24.

To mount rim cover 10 over rim 20 of spare wheel 12, attachment bracket 24 with adapters 54 inserted into holes 26 is first attached to adjacent logs 64 with lug nuts 66. Tongue 50 of latch member 46 is then inserted into recess 36 of latch member 32, and peg 42 is then inserted into hole 30 of bracket 24 to position plate 40 over rim 20. Plate 40 has a diameter at least equal to and preferably slightly greater than rim 20. Padlock 70 is then used to secure bracket 24 and rim 20 together by reaching through wheel 12 from the inside. Wheel mount 14 may be pivoted away from the rear of vehicle 16 to reach through wheel 12.

When mounted, rim cover 10 provides a decorative addition to spare wheel 12, with indicia 74, exemplified by the Jeep logo, being added to the outer face of plate 40, if desired. Importantly, cover 10 also deters theft of spare wheel 12 since plate 40 cannot be removed to provide access to lug nuts 66 due to padlock 70.

In the embodiment shown in FIGS. 11-14, wheel rim 100 is secured to attachment member 102 with cam lock 104. When attached, cam 106 extends through cam hole 108. Rotation of cam 106 secured wheel rim 100 to the spare wheel.

Figure 15:
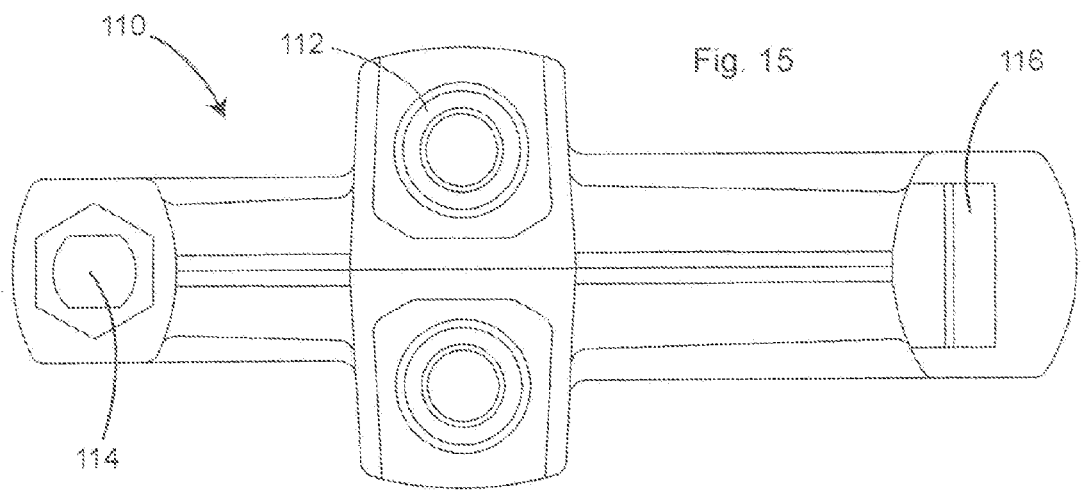
FIG. 15 is a view of the inner face of an alternative attachment bracket.
Figure 16:
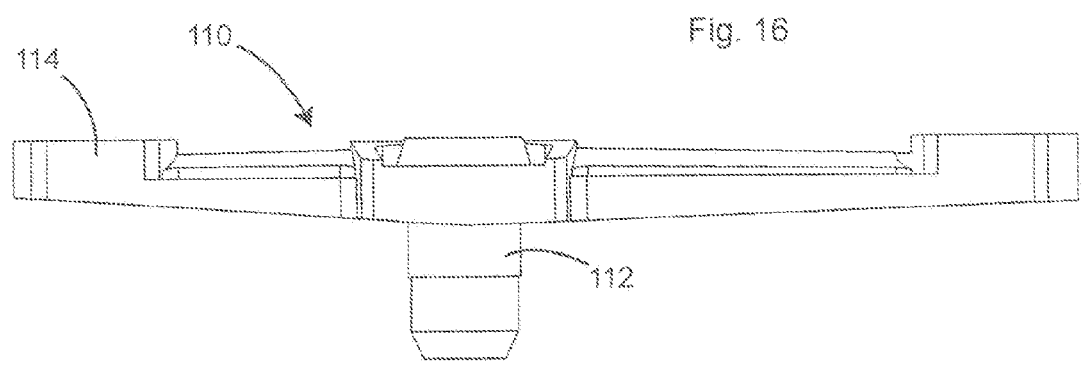
FIG. 16 is a side view of an alternative attachment bracket.
Figure 17:
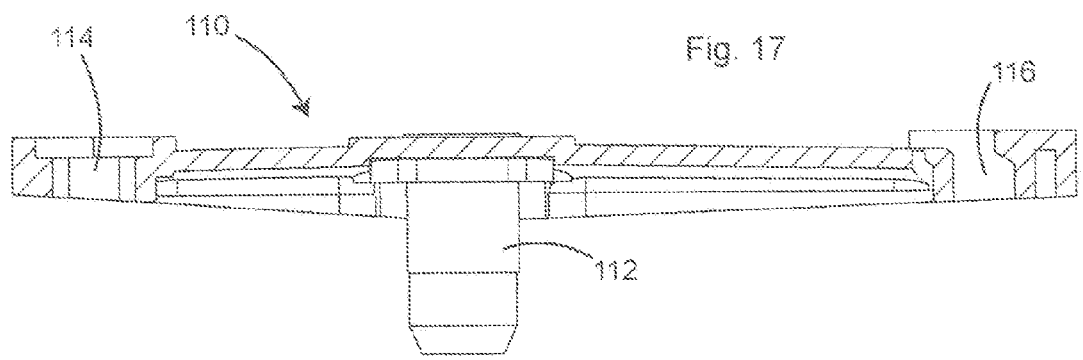
FIG. 17 is a sectional side view of an alternative attachment bracket.

FIGS. 15-17 illustrate an alternative attachment bracket, generally 110, which is similar in construction to bracket 24, except that integral adapters 112 are molded as part of bracket 110 instead of being separate adapters 54. Bracket 110 includes a lock hole 114 and an attachment recess 116.

FIGS. 18 and 19 illustrate the inner face and side, respectively, of an alternative rim 120 that includes an attachment member 122 with a downwardly extending tongue 124, and a lock bole 126 for mourning of cam lock 130, such as the keylocking/flush knob latch illustrated in FIG. 20. Lock 130 is comprised of a pushbutton 132 which is used to depress cam 134. Key 136 is used to prevent pushbutton 132 from being depressed. Pull tab 138 is used to open rim cover 120.

FIG. 21 is a sectional side view of the assembled wheel rim cover mounted on a wheel rim 150, which in turn is mounted on a mounting arm 152. The mounting bracket of FIGS. 15-17 is used. Bolts or lugs, one shown as log 154, extends outwardly from arm 152 and into adapter 112 where it is secured to adapter 112 and wheel rim 150 with lug nut 156. Projection 124 of attachment member 122 is inserted into attachment member recess 116. Cam lock 130 is inserted through lock opening 114, with cam 134 extending behind the inner face of bracket 110 to lock rim plate in place, thereby preventing access to lug nuts 156 and removal of the spare wheel of which wheel rim 150 forms a part.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A locking wheel rim cover for attachment to the outer face of a spare wheel rim having a given diameter, an outer face and log openings comprising:

a) a circular rim plate having a diameter substantial the same as the diameter of said wheel rim, an inner face and an outer face;

b) a locking member extending inwardly from the inner face of said rim plate;

c) a first attachment member extending inwardly from the inner face of said rim plate; and d) an attachment bracket mountable on the outer face of said wheel rim, said bracket including a locking member opening to receive said locking member and a second attachment member connectable with said first attachment member.

2. The nm cover of claim 1, wherein said attachment bracket includes two holes alignable with two of said wheel rim lug openings.

3. The rim cover of claim 2, further including adapters sized for insertion through said holes and into said lug openings, said adapters having tapered distal ends conforming to the interior of said lug openings.

4. The rim cover of claim 1, wherein said locking member is a peg extending perpendicularly inward from said plate inner face and through said locking member opening when said rim plate is against said wheel rim and said first and second attachment members are joined, said peg including a lock receiving bore at its distal end.

5. The rim cover of claim 1, wherein said locking member is a cam lock extending through said locking member opening and having a cam that is positionable against the inner face of said attachment bracket.

6. The rim cover of claim 1, wherein said first attachment member includes a downwardly extending projection and said second attachment member includes a recess to receive said projection.

7. The rim cover of claim 1, wherein said locking member is adjacent the upper edge of said rim plate and said first attachment member is below and radially aligned with said locking member.

8. A locking wheel rim cover for attachment to the outer face of a spare wheel rim having a given diameter, an enter face and lug openings comprising:
   a) a circular rim plate having a diameter substantial the same as the diameter of said wheel rim, an inner face and an outer face;
   b) a locking member extending inwardly from the inner face of said rim plate;
   c) a first attachment member extending inwardly from the inner face of said rim plate; and
   d) an attachment bracket mountable on the outer face of said wheel rim, said bracket including a locking member opening to receive said locking member, a second attachment member connectable with said first attachment member and inwardly extending adapters sized for insertion into said wheel lug openings.

9. The rim cover of claim 8, wherein said attachment bracket includes holes alignable with said wheel rim lug openings, said adapters being insertable into said holes.

10. The rim cover of claim 8, wherein said adapters having inwardly tapered distal ends conforming to the interior of said lug openings.

11. The rim cover of claim 8 wherein said adapters are integral with said attachment bracket.

12. The rim cover of claim 8, wherein said locking member is a cam lock extending through said locking member opening and having a cam that is releasable positioned against the inner face of said attachment bracket.

13. The rim cover of claim 8, wherein said first attachment member includes a downwardly extending projection and said second attachment member includes a recess to receive said projection.

14. The rim cover of claim 8, wherein said locking member is adjacent the upper edge of said rim plate and said first attachment member is below and radially aligned with said locking member.

15. A locking wheel rim cover tor attachment to the outer face of a spare wheel rim having a given diameter, an outer face and lug openings comprising:
   a) a circular rim plate having a diameter substantial the same as the diameter of said wheel rim, an inner face and an outer face;
   b) a cam lock extending inwardly from the inner face of said rim plate, said lock including a keyhole on the outer face of said rim plate;
   c) a first attachment member extending inwardly from the inner face of said rim plate; and
   d) an attachment bracket mountable with lug nuts on the outer face of said wheel rim, said bracket including an opening to receive said cam lock, a second attachment member connectable with said first attachment member and inwardly extending adapters sized for insertion into said wheel lug openings, said adapters including inner bores sized to receive lug nuts.

16. The rim cover of claim 15, wherein said rim plate is planar.

17. The rim cover of claim 15, wherein said first attachment member includes a downwardly extending projection and said second attachment member includes a recess to receive said projection.

18. The rim cover of claim 15, wherein said locking member is adjacent the upper edge of said rim plate and said second attachment member is below and radially aligned with said locking member.

19. The rim cover of claim 15, wherein said cam lock is a keylocking/flush knob latch.

20. The rim cover of claim 15, wherein said adapters are integrally formed with said attachment bracket.

* * * * *

UNITED STATES PATENT AND TRADEMARK OFFICE
CERTIFICATE OF CORRECTION

PATENT NO.         : 9,227,678 B2
APPLICATION NO.    : 13/851263
DATED              : January 5, 2016
INVENTOR(S)        : Gary Bolton It is certified that error appears in the above-identified patent and that said Letters Patent is hereby corrected as shown below:

Title Page item (57), in the Abstract, line 3, log should be "lug"

Specification

In Column 1, line 12, enter should be "outer"

In Column 2, line 17, horn should be "from"

In Column 2, line 20, winch should be "which"

In Column 2, line 25, lag should be "lug"

In Column 2, line 41, arid should be "and"

In Column 2, line 59, protects should be "projects"

In Column 3, line 1, enter should be "outer"

In Column 3, line 8, enter should be "outer"

In Column 3, line 16, enter should be "outer"

In Column 3, line 52, lop should be "lug"

In Column 4, line 9, logs should be "lugs"

Claims

In Column 4, line 62, claim 1, log should be "lug"

In Column 5, line 8, claim 2, nm should be "rim"

In Column 6, line 18, claim 15, tor should be "for"

Signed and Sealed this
Nineteenth Day of April, 2016

Michelle K. Lee
*Director of the United States Patent and Trademark Office*